United States Patent
Sugaya (10) Patent No.: US 9,635,171 B2
(45) Date of Patent: Apr. 25, 2017

(54) USER PROFILE DISPLAY USER TERMINAL, USER PROFILE DISPLAY SYSTEM, USER PROFILE DISPLAY METHOD, AND PROGRAM FOR USER PROFILE DISPLAY USER TERMINAL

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 14/845,422

(22) Filed: Sep. 4, 2015

(65) Prior Publication Data

US 2017/0070608 A1 Mar. 9, 2017

(51) Int. Cl.
*H04M 3/533* (2006.01)
*H04M 3/42* (2006.01)
*H04L 29/08* (2006.01)

(52) U.S. Cl.
CPC ...... *H04M 3/42042* (2013.01); *H04L 67/306* (2013.01)

(58) Field of Classification Search
CPC .... H04M 3/42042; H04M 1/57; H04M 1/575; H04M 2207/18; H04M 1/72519
USPC ......... 455/415, 413, 433, 435.1, 550.1, 551, 455/566, 567, 95
See application file for complete search history.

(56) References Cited

U.S. PATENT DOCUMENTS

| | | | | |
|---|---|---|---|---|
| 2007/0268937 A1* | 11/2007 | Kubica | ............ | H04L 29/06027 370/503 |
| 2007/0287453 A1* | 12/2007 | Wang | ................ | H04M 3/42017 455/435.1 |
| 2010/0046731 A1* | 2/2010 | Gisby | ................... | H04M 3/436 379/211.01 |
| 2010/0088430 A1* | 4/2010 | Ton | ......................... | H04W 8/20 709/248 |
| 2010/0153410 A1* | 6/2010 | Jin | .................... | G06F 17/30569 707/758 |
| 2013/0023238 A1* | 1/2013 | Kaplan | ............. | H04M 3/42042 455/411 |
| 2013/0331147 A1* | 12/2013 | Chang | ..................... | H04W 4/18 455/556.1 |
| 2016/0173684 A1* | 6/2016 | Lobo | ................. | H04M 3/42068 379/201.11 |

FOREIGN PATENT DOCUMENTS

JP 2011-193318 9/2011

* cited by examiner

*Primary Examiner* — Cong Tran
(74) *Attorney, Agent, or Firm* — Lex IP Meister, PLLC (57) ABSTRACT

The present invention is to display a caller's user profile and a previously set content to a callee. The present invention provides a user profile display user terminal and a user profile display system that use a user profile server 200 to centrally manage the user profile of a caller who makes an outgoing call with a phone terminal 50, allow a callee who owns a user terminal 10 to set a content to be displayed or allow a caller to set the content to be displayed to a callee, depending on a caller, store the set content in a user profile database 250, so as to display the user profile and the content when the callee receives an incoming call and also so as to display a call log and an answering machine log that are related to the caller.

5 Claims, 7 Drawing Sheets

Fig. 1

| PHONE NUMBER | NAME | CONTENT |
|---|---|---|
| 090-XXX-XXXX | Ichiro Tanaka | Friend from school |
| 080-YYY-YYYY | Taro Suzuki | In charge of company A: Drink together on December 2 |
| 03-ZZZZ-ZZZZ | Fresh Mart Shinagawa | All boxed meals are at 50-yen discount during December 1 to 15. |

| PHONE NUMBER | NAME | CONTENT |
|---|---|---|
| 090-XXX-XXXX | Ichiro Tanaka | Friend from school |
| 080-YYY-YYYY | Taro Suzuki | In charge of company A; Drink together on December 2 |
| 03-ZZZZ-ZZZZ | Fresh Mart Shinagawa | All boxed meals are at 50-yen discount during December 1 to 15. |

USER PROFILE DISPLAY USER TERMINAL, USER PROFILE DISPLAY SYSTEM, USER PROFILE DISPLAY METHOD, AND PROGRAM FOR USER PROFILE DISPLAY USER TERMINAL

TECHNICAL FIELD

The present invention relates to a caller's user profile display user terminal, a caller's user profile display system, a caller's user profile display method, and a program for the user terminal.

BACKGROUND ART

Recently, various services have been provided to users by connecting phone terminals to web servers, etc. through a public network. In particular, a high functional mobile terminal provided with a call function is called smart phone terminal. Many people are using a smartphone instead of a conventional mobile phone.

Conventionally by using the caller ID function or the address book of the mobile phone, a callee is able to refer to caller's information before starting phone conversation. Additionally, in recent years, more callers need to show information specific to a callee before starting phone conversation.

For approaching such problems, a method of allowing a caller to select information including the caller's name depending on a callee and notify the selected information of the callee when a caller is making an outgoing call is disclosed.

CITATION LIST

Patent Literature

Patent Document 1: JP 2011-193318 A

SUMMARY OF INVENTION

Patent Document 1 discloses a method of associating the input information related to an outgoing call with the caller's name to be notified to a callee and storing the associated information in the setting information memory and allowing the caller informational identifying unit to identify the caller's name to be notified to the callee to transmit a call message including the caller's name to the callee.

However, in the method disclosed in Patent Document 1, only the caller's name that the caller desires to display on the callee side can be set, and the data stored in the callee side is not guaranteed to be referred. Therefore, the profit of the callee side has been insufficiently guaranteed.

Accordingly, an objective of the present invention is to provide a user profile display user terminal and a user profile display system that use a server to centrally manage a caller's user profile, allow a callee to set the content to be displayed or allow a caller to set the content to be displayed to a callee, depending on a caller, so as to display the user profile and the content to the callee when the callee receives an incoming call and also so as to display a call log and an answering machine log that are related to the caller.

According to the first aspect of the present invention, a user terminal provided with a call function and a display unit and communicatively connected with a user profile server, includes:

a caller's number acquisition unit acquiring a caller's number associated with an incoming call received by the call function;

a user profile acquisition unit acquiring a user profile associated and stored with the acquired caller's number from the user profile server; and a user profile display unit outputting the acquired user profile to the display unit.

According to the first aspect of the present invention, a user terminal provided with a call function and a display unit and communicatively connected with a user profile server, acquires a caller's number associated with an incoming call received by the call function, acquires the user profile associated and stored with the acquired caller's number from the user profile server, and outputs the acquired user profile to the display unit.

The first aspect of the present invention is the category of a user profile display user terminal, but the categories of a user profile display method and a program for the user terminal have the same functions and effects.

According to the second aspect of the present invention, the user terminal according to the first aspect of the present invention, further includes:

a user content acquisition unit acquiring a content associated with the acquired caller's number and stored in the user profile server; and a user content display unit displaying the acquired content on the display unit.

According to the second aspect of the present invention, the user terminal according to the first aspect of the present invention acquires the content associated with the caller's number and stored in the user profile server; and displays the acquired content on the display unit.

According to the third aspect of the present invention, the user terminal according to the first or the second aspect of the present invention further comprising:

a memory unit;

a log reading-out unit reading out information including at least one of a call log and an answering machine log associated with the acquired caller's number and stored in the memory unit; and a log display unit displaying the read-out information on the display unit.

According to the third aspect of the present invention, the user terminal according to the first or the second aspect of the present invention includes a memory unit, reads out information including at least one of a call log and an answering machine log associated with the acquired caller's number and stored in the memory unit, and displays the read-out information on the display unit.

According to the fourth aspect of the present invention, a user profile display system includes a user terminal provided with a call function and a display unit and a user profile server, the user terminal being communicatively connected with the user profile server, in which the user terminal includes:

a caller's number acquisition unit acquiring a caller's number associated with an incoming call received by the call function;

a user profile acquisition unit acquiring a user profile associated and stored with the acquired caller's number from the user profile server; and a user profile display unit outputting the acquired user profile to the display unit, and the user profile server includes:

a user profile database associating and storing a call number with a user profile;

a user profile extraction unit extracting a user profile associated and stored with the call number received from the user terminal from the user profile database; and a user profile transmitting unit transmitting the extracted user profile to the user terminal.

According to the fourth aspect of the present invention, in a user profile display system including a user terminal provided with a call function and a display unit and a user profile server, the user terminal being communicatively connected with the user profile server, the user terminal acquires a caller's number associated with an incoming call received by the call function, acquires a user profile associated and stored with the acquired caller's number from the user profile server, and outputs the acquired user profile to the display unit. The user profile server includes a user profile database associating and storing a call number with a user profile, extracts a user profile associated and stored with the call number received from the user terminal from the user profile database; and transmits the extracted user profile to the user terminal.

According to the fifth aspect of the present invention, a user profile display method executed by a user terminal provided with a call function and a display unit and communicatively connected with a user profile server, includes the steps of:

acquiring a caller's number associated with an incoming call received by the call function;

acquiring a user profile associated and stored with the acquired caller's number from the user profile server; and outputting the acquired user profile to the display unit.

According to the sixth aspect of the present invention, a computer program product for use in a user terminal provided with a call function and a display unit and communicatively connected with a user profile server, includes a non-transitory computer usable medium having a set of instructions physically embodied therein, the set of instructions including computer readable program code, which when executed by the user terminal causes the information processing unit to:

acquire a caller's number associated with an incoming call received by the call function;

acquire a user profile associated and stored with the acquired caller's number from the user profile server; and output the acquired user profile to the display unit.

The present invention provides a user profile display user terminal and a user profile display system that use a server to centrally manage a caller's user profile, allow a callee to set the content to be displayed or allow a caller to set the content to be displayed to a callee, depending on a caller, so as to display the user profile and the content to the callee when the callee receives an incoming call and also so as to display a call log and an answering machine log that are related to the caller.

DESCRIPTION OF EMBODIMENTS

Embodiments of the present invention are described below with reference to the attached drawings. However, this is illustrative only, and the scope of the present invention is not limited thereto.

Overview of User Profile Display System 1

Figure 1:
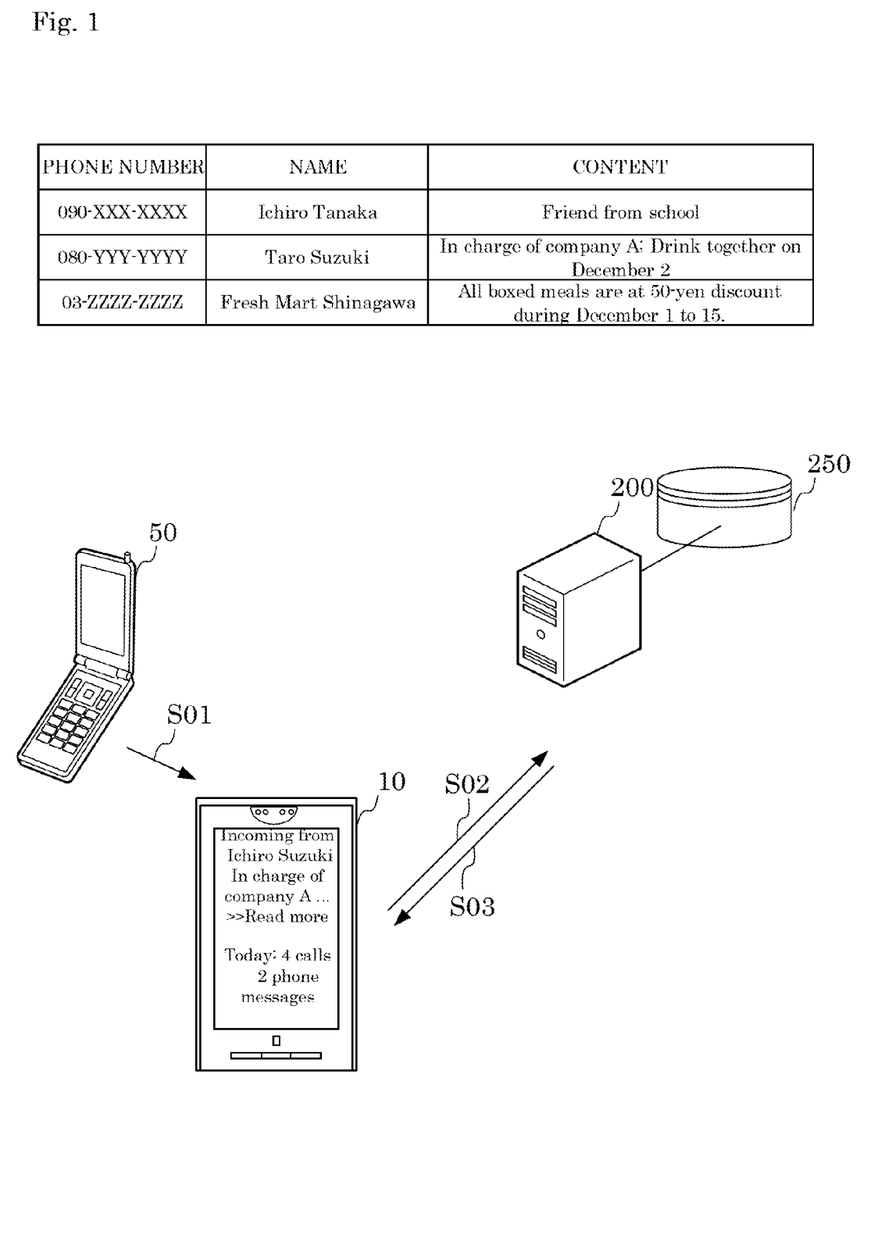
FIG. 1 shows an overview of the user profile display system 1.

FIG. 1 shows the overall view of a user profile display system 1 according to a preferred embodiment of the present invention. The overview is described below with reference to FIG. 1.

First, the user terminal 10 receives incoming call from a phone terminal 50 (Step S01). The phone terminal 50 may be a general telephone terminal.

When receiving an incoming call, the user terminal 10 acquires the call number of the phone terminal 50 and inquires of the user profile server 200 about the user profile associated with the call number (Step S02).

The user profile server 200 receiving the inquiry extracts the user profile about which the user terminal 10 has inquired from the user profile database 250.

FIG. 1 shows an example of the incoming call from "080-YYYY-YYYY." In the user profile database 250, the call number "080-YYYY-YYYY" is associated and stored with the name "Taro Suzuki" and the content "In charge of company A; Drink together on December 2."

The user profile server 200 transmits the extracted user profile as described above to the user terminal 10 (Step S03). The user terminal 10 receives and displays the user profile on the display unit. The user terminal 10 also reads out an email log, a call log, and an answering machine log associated with the received user profile and displays the read-out logs on the display unit.

Information in the user profile database 250 may been divided by user terminals 10 or their owners. This is because if the information is shared, the private information is leaked to others, which is inadequate. Moreover, the content stored in the user profile database 250 may be set by the user terminal 10 or by its owner or may be set by the owner of the user terminal associated with a call number. As a result, shops can advertise their campaign, etc., as illustrated in FIG. 1.

Configuration of User Profile Display System 1

Figure 2:
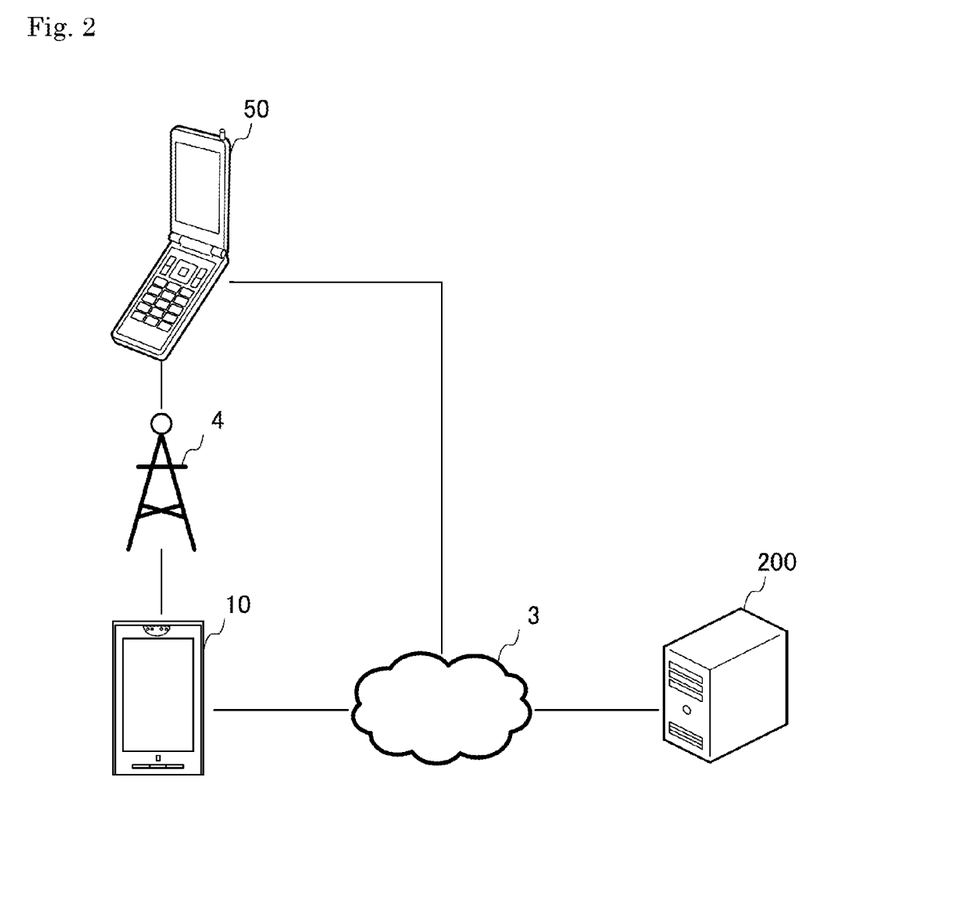
FIG. 2 shows an overall schematic diagram of the user profile display system 1.

FIG. 2 shows a system configuration diagram of the user profile display system 1 as a preferred embodiment of the present invention. The user profile display system 1 includes a user terminal 10, a phone terminal 50, a web page providing server 100, a user profile server 200, a user profile database 250, a public line network 3 (e.g., the Internet network, a third generation communication network, a fourth generation communication network), and a telephone network 4.

The user terminal 10 is communicatively connected with the user profile server 200 through the public line network 3. The phone terminal 50 is communicatively connected with the user profile server 200 through the public line network 3. Moreover, the user terminal 10 is communicatively connected with the phone terminal 50 connected through the telephone network 4. The user terminal 10 may be communicatively connected with the phone terminal 50 through the public network 3. The user terminal 10 may be communicatively connected with the public line network 3 through a network device such as a router.

The user terminal 10 may be a general information terminal with a call function, which enables a user to browse web pages and to perform procedures. The user terminal 10 is an information device or an electrical appliance with the functions to be described later. For example, the user terminal 10 may be a mobile phone, a smart phone, a complex printer, a television, a network device such as a router or a gateway, and a computer. The user terminal 10 may also be white goods such as a refrigerator and a washing machine. The user terminal 10 may also be general information appliances such as a telephone, a netbook terminal, a slate terminal, an electronic book terminal, an electronic dictionary terminal, a portable music player, and a portable player and recorder. The user terminal 10 is at least provided with a call function.

The phone terminal 50 is a general information appliance at least provided with a call function in the same way as the user terminal 10.

The user profile server 200 is provided with the user profile database 250, which transmits a user profile in response to an inquiry from the user terminal 10. The user profile server 200 stores the user profile database 250 in the memory unit.

Functions

Figure 3:
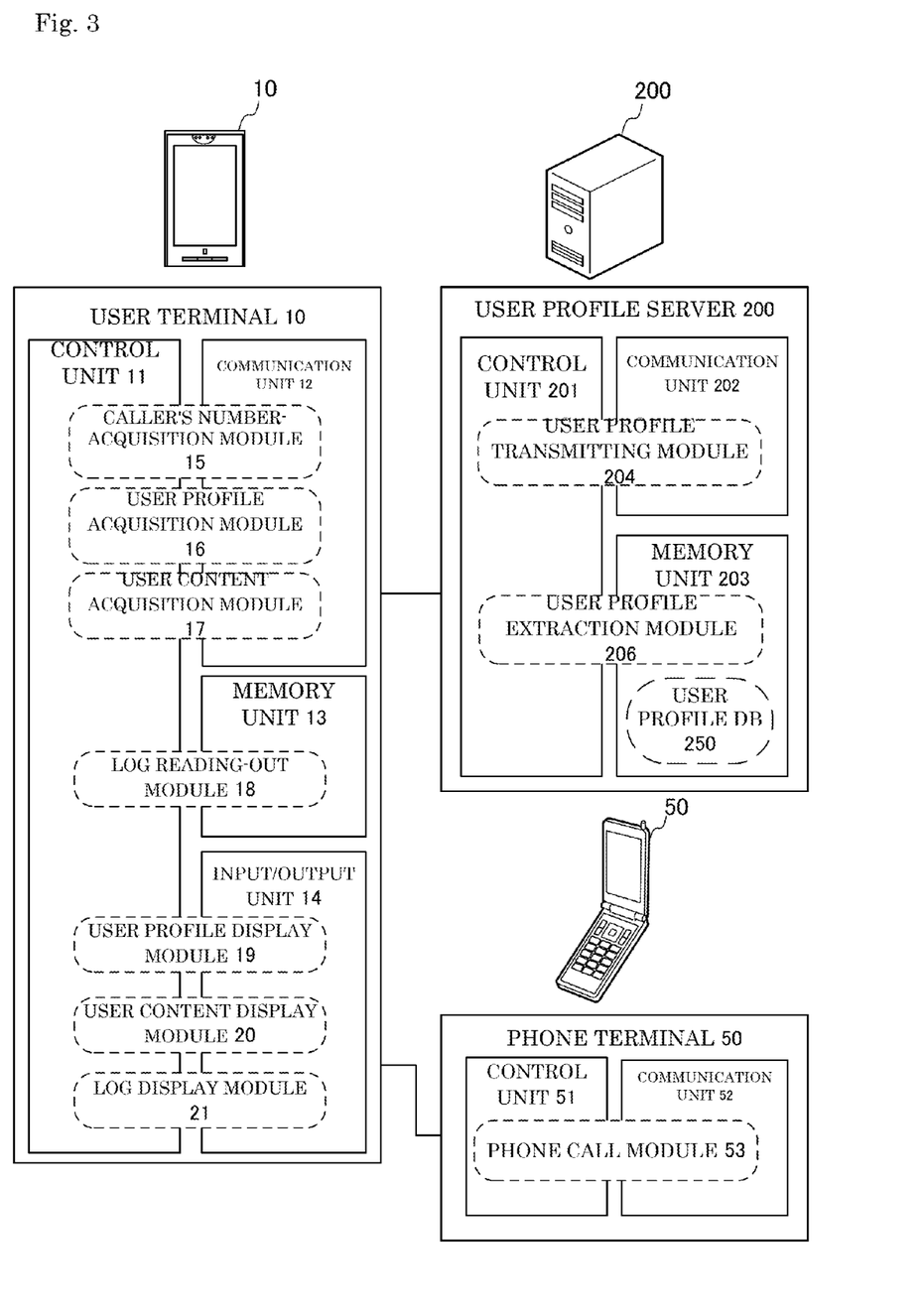
FIG. 3 shows a functional block diagram of the user terminal 10, the phone terminal 50, and the user profile server 200.

FIG. 3 shows the relationship among the respective functions of the user terminal 10, the web page providing server 100, and the user profile server 200.

The user terminal 10 is provided with a control unit 11 including a central processing unit (hereinafter referred to as "CPU"), a random access memory (hereinafter referred to as "RAM"), and a read only memory (hereinafter referred to as "ROM"); and a communication unit 12 including a Wireless Fidelity or Wi-Fi® enabled device complying with, for example, IEEE 802.11, or a wireless device complying with the IMT-2000 standard such as the third generation mobile communication system. The communication unit may include a wired device for LAN connection.

The user terminal 10 is also provided with a storage unit as a memory unit 13 such as a hard disk or a semiconductor memory to store data. The user terminal 10 is also provided with an input/output unit 14 including a display unit outputting and displaying data and images that have been controlled by the control unit; and also including a touch panel, a keyboard, and a mouse that receive input from a user and a supporter.

In the user terminal 10, the control unit 11 reads a predetermined program and cooperates with the communication unit 12 to achieve a caller's number acquisition module 15, a user profile acquisition module 16, and a user content acquisition module 17. The control unit 11 also reads a predetermined program and cooperates with the memory unit 13 to achieve a log reading-out module 18.

In the same way as the user terminal 10, the phone terminal 50 is provided with a control unit 51 including a CPU, a RAM, and a ROM; and a communication unit 52 including a Wi-Fi® enabled device complying with, for example, IEEE 802.11, or a wireless device complying with the IMT-2000 standard such as the third generation mobile communication system. The communication unit may include a wired device for LAN connection.

In the information processing unit 50, the control unit 51 reads a predetermined program and cooperates with the communication unit 52 to achieve a phone call module 53.

The user profile server 200 includes a control unit 201 including a CPU, a RAM, and a ROM; and a communication unit 202 including a Wi-Fi® enabled device complying with, for example, IEEE 802.11. The communication unit may include a wired device for LAN connection. The user profile server 200 is also provided with a storage unit as the memory unit 203 such as a hard disk or a semiconductor memory to store data. The user profile server 200 stores the user terminal management database 250 in the memory unit 203.

In the user profile server 200, the control unit 201 reads a predetermined program and cooperates with the communication unit 202 to achieve a user profile transmitting module 204. The control unit 201 also reads a predetermined program and cooperates with the memory unit 203 to achieve a user profile extraction module 206.

User Profile Display Process

Figure 4:
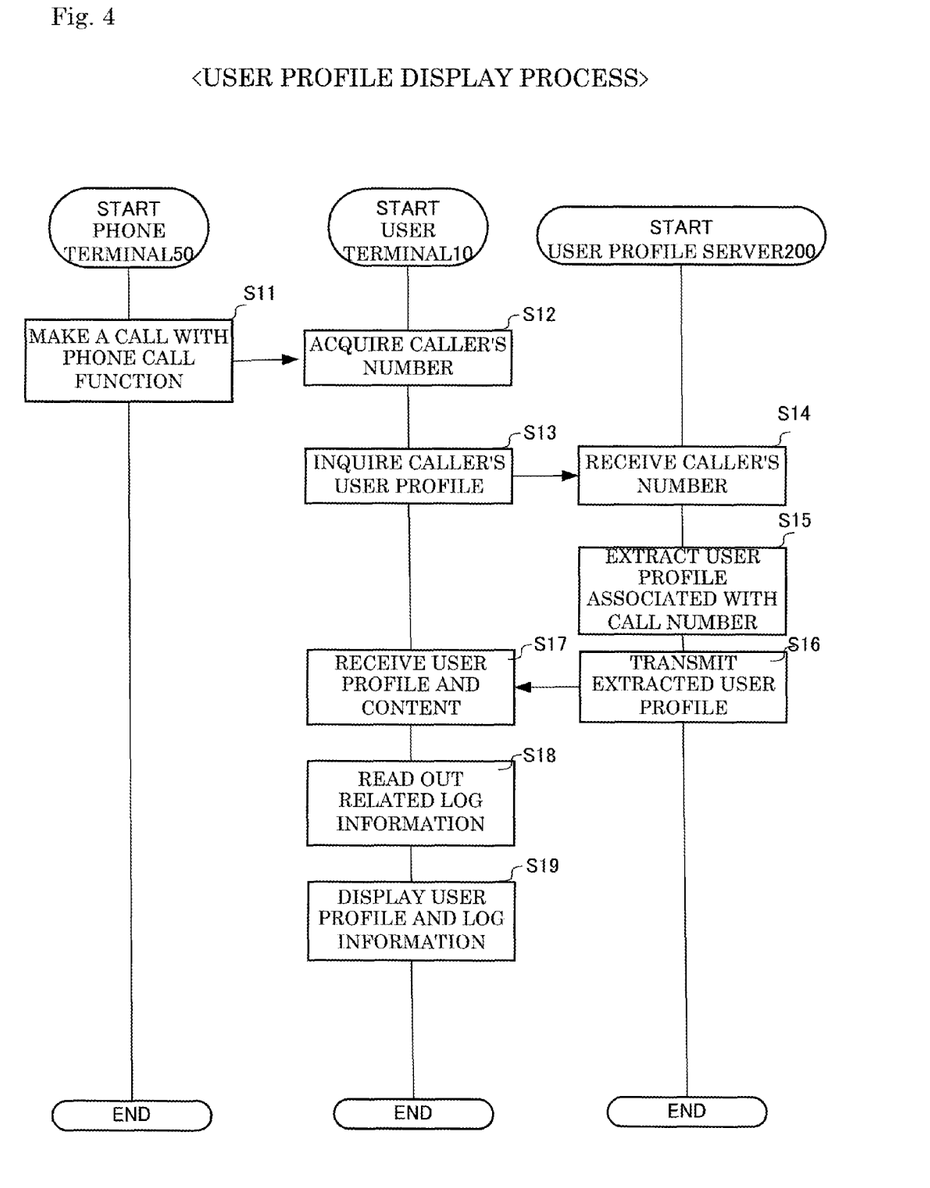
FIG. 4 shows a flow chart illustrating the user profile display process executed by the user terminal 10, the phone terminal 50, and the user profile server 200.

FIG. 4 shows a flow chart of the user profile display process executed by the user terminal 10, the phone terminal 50, and the user profile server 200. The process executed by the modules of each of the above-mentioned devices is explained together with this process.

First, the phone call module 53 of the phone terminal 50 makes an outgoing call to the user terminal 10 (Step S11). Although made through a telephone network 4, the phone call may be made through a public network 3 such as VoIP or between specific applications. At that time, the term "call number" used hereinafter is interpreted to mean an identifier uniquely identifying at least one of a callee and a device owned by a callee and not required to be composed of only numbers. In other words, the call number herein may be composed of elements including alphabet and Japanese characters other than numbers.

If the software previously operating on the user terminal 10 initiates a phone call service or detects an incoming call received by another kind of software fulfilling a call function, the caller's number acquisition module 15 of the user terminal 10 acquires the caller's number (Step S12).

The user profile acquisition module 16 of the user terminal 10 then transmits the acquired call number to the user profile server 200 to inquire a user profile associated and registered with the call number (Step S13). The user profile transmitting module 204 of the user profile server 200 receives the inquiry together with a call number (Step S14).

The user profile extraction module 206 of the user profile server 200 retrieves the user profile database 250 with the received call number and extracts a user profile associated and stored with the call number (Step S15). The user profile may include a content registered by a callee or a caller.

Figure 7:
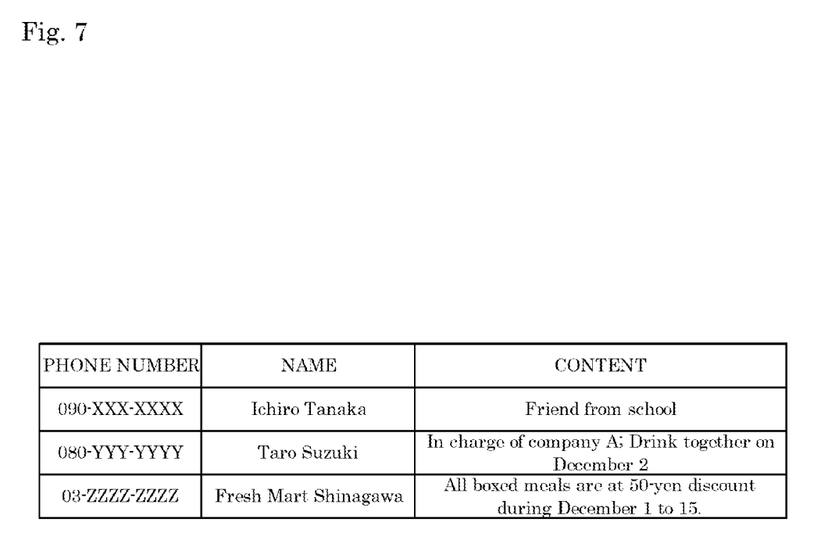
FIG. 7 shows an example of the user profile table in the user profile database 250 stored in the user profile server 200.

FIG. 7 shows an example of the user profile table in the user profile database 250. The user profile table stores call numbers, device owner's names, and contents. The number of the tables may be the same as that of the user terminals 10. Moreover, the content may be set by the owner of the user terminal 10 for the explanation of the owner and the device or by the owner of the phone terminal 50 to display the content to the owner of the user terminal 10. The owner of the phone terminal 50 may set the content associated with the call number of the phone terminal 50 and stored in all the storage areas in a batch.

The user profile transmitting module 204 then transmits the extracted user profile to the user terminal 10 (Step S16). The user profile acquisition module 16 and the user content acquisition module 17 of the user terminal 10 receives the user profile and the content included in the user profile, respectively (Step S17).

The log reading-out module 18 of the user terminal 10 reads out related logs including a call log with the call number and an answering machine log that are associated with the acquired user profile from the memory unit (Step S18). For example, when a call number and an email address are associated with each other in the address book, the number of email messages and the latest log may be extracted as well.

Finally, the user profile display module 19 of the user terminal 10 displays the received user profile on the display unit, the user content display module 20 displays the user content included in the user profile on the display unit, and the log display module 21 displays read-out log information on the display unit (Step S19).

Figure 5:
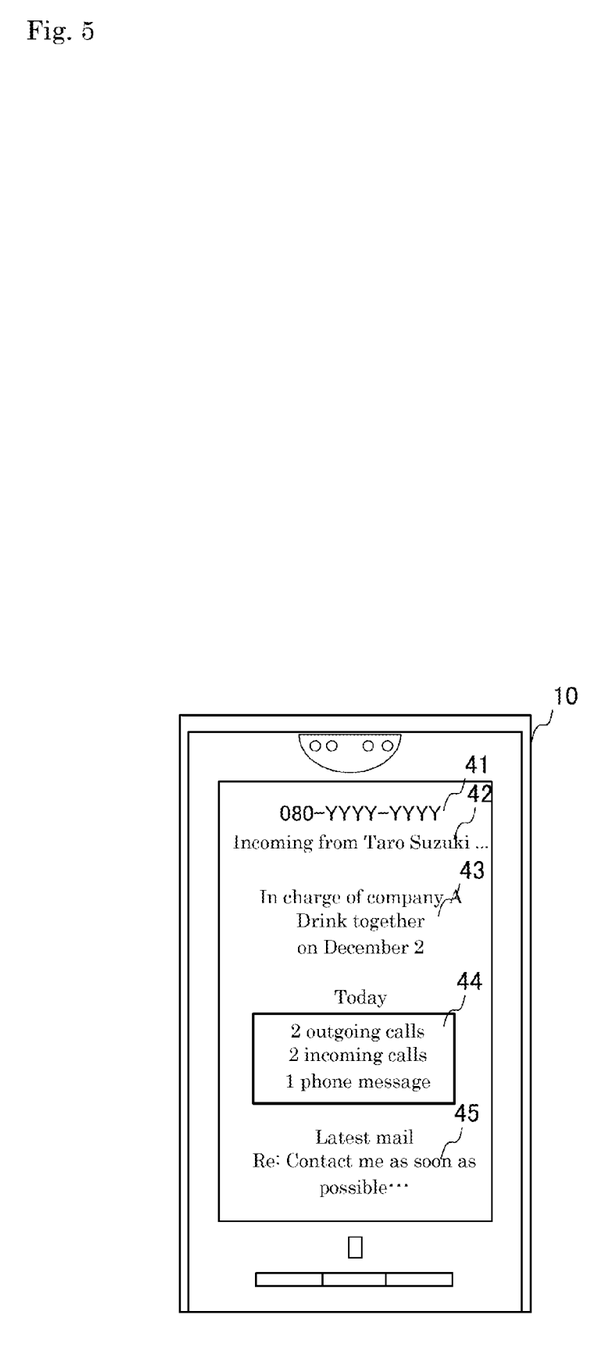
FIG. 5 shows an example of the user profile displayed on the user terminal 10.

FIG. 5 shows an example of the display unit of the user terminal 10 displaying the user profile. After receiving an incoming call and acquiring a user profile and log information as described above, the user terminal 10 displays the call number 41 and the caller's name 42 together with an incoming alert. The user terminal 10 also displays the content 43, the log information 44, and the latest exchanged email 45 that are associated and stored with the call number. In this example, only a user's name is illustrated as the user profile. However, profile information on a home address, a birthday, a blood type, a work experience, or a birthplace may be displayed as well.

Figure 6:
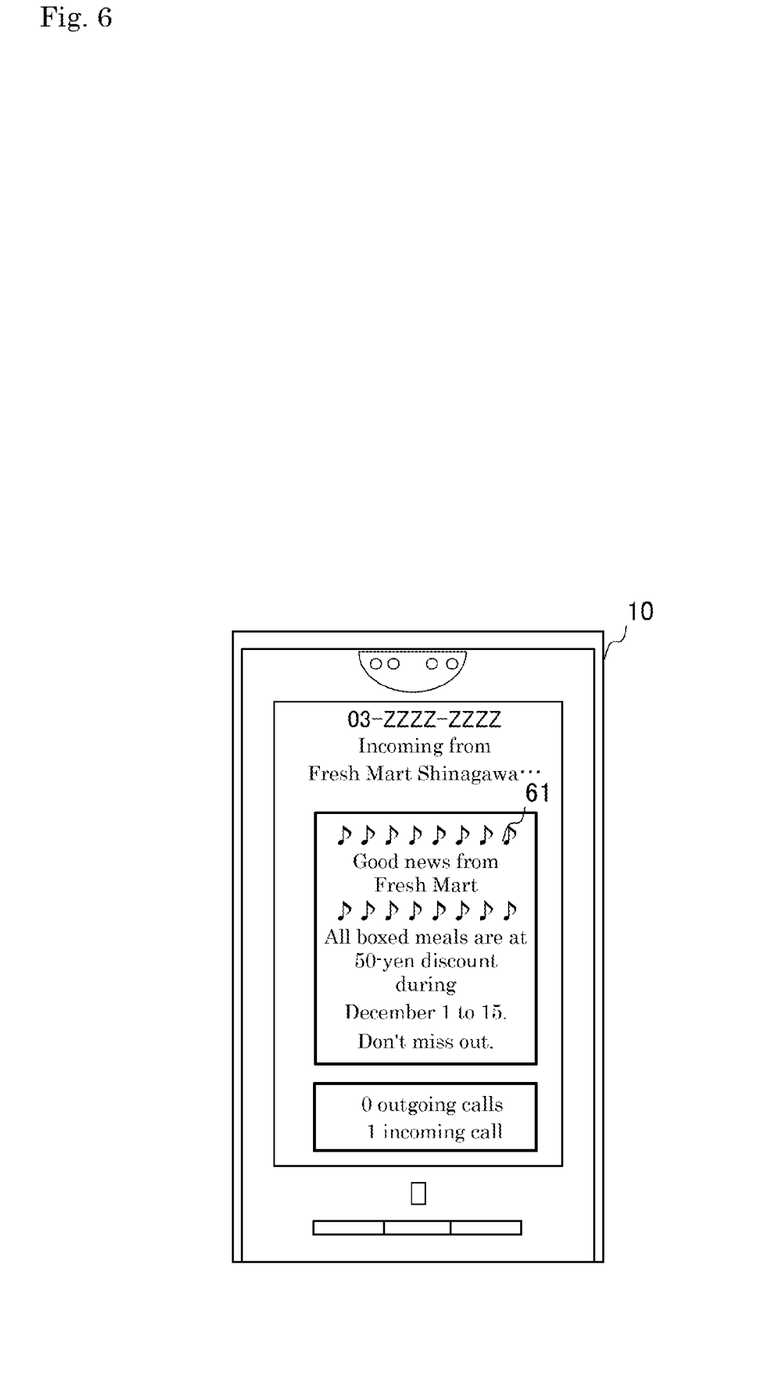
FIG. 6 shows an example of the content displayed on the user terminal 10.

Moreover, from the viewpoint of personal information protection, the memory area of the user profile may be divided by user terminals 10. The content and the user profile may be set from either the user terminal 10 or the phone terminal 50. FIG. 6 shows an example of the display content 61 set by the owner of the phone terminal 50. The content set by the user terminal 10 and the content set by the phone terminal 50 may independently exist. Moreover, the display format of the content may be a markup language.

To achieve the means and the functions that are described above, a computer (including CPU, an information processor, and various terminals) reads and executes a predetermined program. For example, a program is provided in a form recorded in a computer-readable recording medium such as a flexible disk, a CD (e.g., CD-ROM), and a DVD (e.g., DVD-ROM and DVD-RAM). In this case, a computer reads a program from the recording medium, forwards and stores the program to and in an internal or an external storage, and executes it. For example, the program may be previously recorded in memory (a recording medium) such as a magnetic disk, an optical disk, and a magnetic optical disk, and then provided from the memory to the computer through a communication line.

The embodiments of the present invention are described above. However, the present invention is not limited to these embodiments. In addition, the effects described in these embodiments merely illustrate the most preferable effects resulting from the present invention, and the effects according to the present invention are not limited to those described in these embodiments.

REFERENCE SIGNS LIST

1 User profile display system
3 Public network
4 Telephone network
10 User terminal
50 Phone terminal
200 User profile server
250 User profile database

What is claimed is:

1. A user terminal provided with a call function and a display unit and communicatively connected with a user profile server, comprising:
    a caller's number acquisition unit acquiring a caller's number associated with an incoming call received by the call function;
    a user profile acquisition unit acquiring a user profile associated and stored with the acquired caller's number from the user profile server, the user profile including a content associated with the acquired caller's number; and
    a user profile display unit outputting the acquired user profile to the display unit when receiving the incoming call,
    wherein the user profile is configured to allow the content be registered by both a user of the user terminal and the caller, and
    wherein the display unit displays the content registered by the user when the content has been registered by the user and displays the content registered by the caller when the content has been registered by the caller.

2. The user terminal according to claim 1, further comprising:
    a memory unit;
    a log reading-out unit reading out information including at least one of a call log and an answering machine log associated with the acquired caller's number and stored in the memory unit; and
    a log display unit displaying the read-out information on the display unit.

3. A user profile display system comprising a user terminal provided with a call function and a display unit and a user profile server, the user terminal being communicatively connected with the user profile server, wherein
    the user terminal includes:
    a caller's number acquisition unit acquiring a caller's number associated with an incoming call received by the call function;
    a user profile acquisition unit acquiring a user profile associated and stored with the acquired caller's number from the user profile server, the user profile including a content associated with the acquired caller's number; and
    a user profile display unit outputting the acquired user profile to the display unit when receiving the incoming call, and
    the user profile server includes:
    a user profile database associating and storing a call number with a user profile;
    a user profile extraction unit extracting a user profile associated and stored with the call number received from the user terminal from the user profile database; and
    a user profile transmitting unit transmitting the extracted user profile to the user terminal,
    wherein the user profile is configured to allow the content be registered by both a user of the user terminal and the caller, and
    wherein the display unit displays the content registered by the user when the content has been registered by the user and displays the content registered by the caller when the content has been registered by the caller.

4. A user profile display method executed by a user terminal provided with a call function and a display unit and communicatively connected with a user profile server, comprising the steps of:

acquiring a caller's number associated with an incoming call received by the call function;

acquiring a user profile associated and stored with the acquired caller's number from the user profile server, the user profile including a content associated with the acquired caller's number; and outputting the acquired user profile to the display unit when receiving the incoming call, wherein the user profile is configured to allow the content be registered by both a user of the user terminal and the caller, and wherein outputting the acquired user profile comprises displaying the content registered by the user when the content has been registered by the user and displaying the content registered by the caller when the content has been registered by the caller.

5. A computer program product for use in a user terminal provided with a call function and a display unit and communicatively connected with a user profile server, comprising a non-transitory computer usable medium having a set of instructions physically embodied therein, the set of instructions including computer readable program code, which when executed by the user terminal causes the information processing unit to:

acquire a caller's number associated with an incoming call received by the call function;

acquire a user profile associated and stored with the acquired caller's number from the user profile server, the user profile including a content associated with the acquired caller's number; and output the acquired user profile to the display unit when receiving the incoming call, wherein the user profile is configured to allow the content be registered by both a user of the user terminal and the caller, and wherein outputting the acquired user profile comprises displaying the content registered by the user when the content has been registered by the user and displaying the content registered by the caller when the content has been registered by the caller.

* * * * *